(12) United States Patent
Netz et al.

(10) Patent No.: US 7,275,022 B2
(45) Date of Patent: *Sep. 25, 2007

(54) SYSTEM AND METHOD FOR ANALYTICALLY MODELING DATA ORGANIZED ACCORDING TO NON-REFERRED ATTRIBUTES

(75) Inventors: Amir Netz, Bellevue, WA (US); Cristian Petculescu, Redmond, WA (US); Mosha Pasumansky, Redmond, WA (US); Richard R. Tkachuk, Sammamish, WA (US); Alexander Berger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

This patent is subject to a terminal disclaimer.

(21) Appl. No.: 10/199,612

(22) Filed: Jul. 19, 2002

(65) Prior Publication Data

US 2004/0015472 A1    Jan. 22, 2004

(51) Int. Cl.
*G06F 17/10* (2006.01)
*G06F 7/60* (2006.01)

(52) U.S. Cl. .............................. 703/2; 707/3; 707/100; 707/102

(58) Field of Classification Search .................... 703/2; 707/2, 3, 100, 102
See application file for complete search history.

(56) References Cited

U.S. PATENT DOCUMENTS 6,205,447 B1 * 3/2001 Malloy ....................... 707/102
6,480,836 B1 * 11/2002 Colby et al. .................... 707/3
6,775,675 B1 * 8/2004 Nwabueze et al. .......... 707/100
6,985,906 B2 * 1/2006 Yamashita ................... 707/102
2002/0059267 A1 * 5/2002 Shah et al. ................. 707/100
2003/0126143 A1 * 7/2003 Roussopoulos et al. ..... 707/100
2004/0122813 A1 * 6/2004 Shah et al. ..................... 707/3

OTHER PUBLICATIONS

Dash, A.K. et al., "Dimensional Modeling for a Data Warehouse", *Software Engineering Notes*, Nov. 2001, 26(6), 83-84.
Espil, M.M. et al., "Efficient Intensional Redefinition of Aggregation Hierarchies in Multidimensional Dayabases", *DOLAP*, Nov. 9, 2001, 8 pages.
Harinarayan, V. et al., "Implementing Data Cubes Efficiently", *SIGMOD*, 1996, 205-216.

(Continued)

*Primary Examiner*—Paul Rodriguez
*Assistant Examiner*—Andre Pierre-Louis
(74) *Attorney, Agent, or Firm*—Woodcock Washburn LLP

(57) ABSTRACT

A system and method for analytically modeling data organized according to non-referred attributes is disclosed. Data stored in a first and a second relational data table is analytically modeled in a data cube. The first table organizes a first type according to a first attribute. The second table organizes a second type according to the first attribute and a second attribute. A first measure is modeled according to the first type of the first table. A first dimension is modeled according to the first attribute of the first and second tables. A second dimension is modeled according to the second attribute of the second table. The first measure is tied to the first dimension according to the first attribute of the first table to allow the first measure to be analyzed by the first dimension according to the first attribute. The first measure is tied to the second dimension by, for each entry of the first dimension, allocating the entry to each entry of the second dimension in a predetermined manner.

21 Claims, 10 Drawing Sheets

OTHER PUBLICATIONS

Hurtado, C.A. et al., "Updating OLAP Dimensions", *DOLAP*, 1999, 60-66.

Niemi, T. et al., "Constructing OLAP Cubes Based on Queries", *DOLAP*, Nov. 9, 2001, 9-15.

Pourabbas, E. et al., "Characterization of Hierarchies and Some Operators in OLAP Environment", *DOLAP*, 1999, 54-59.

Chaudhuri, S. et al., "An Overview of Data Warehousing and OLAP Technology", *SIGMOD Record*, Mar. 1997, 26(1), 65-74, XP-002193792.

Pedersen, T. et al., "Multidimensional Data Modeling for Complex Data", *A TimeCenter Technical Report*, Nov. 13, 1998, 1-25.

* cited by examiner

Fig. 2

| Sales 200 ||
|---|---|
| Product 210 | Quantity Sold 212 |
| Bread | 30 |
| Chips | 10 |
| Cookies | 2 |

Fig. 3

| Stock 300 | | |
|---|---|---|
| Product 310 | Aisle 312 | Quantity Stocked 314 |
| Bread | 1 | 20 |
| Bread | 2 | 30 |
| Bread | 3 | 50 |
| Chips | 1 | 4 |
| Chips | 2 | 6 |
| Cookies | 1 | 7 |

Fig. 5

| Sales 500 ||
|---|---|
| Customer 510 | Quantity Sold 512 |
| Burt | 30 |
| Charlie | 10 |
| Chris | 2 |

Fig. 6

| Sales 600 ||
|---|---|
| Customer 610 | Demographic 612 |
| Burt | Rich |
| | Young |
| | Single |
| Charlie | Rich |
| | Young |
| Chris | Rich |

Fig. 9

| Hash Table 900 ||
| --- | --- |
| Customer 720 | Demographic 722 |
| Burt | Rich |
| | Young |
| | Single |
| Charlie | Rich |
| | Young |
| Chris | Rich |

Fig. 10

| Record 1000 |||
|---|---|---|
| Customer 720 | Demographic 722 | Quantity Sold 512 |
| Burt | Rich | 10 |
| | Young | 10 |
| | Single | 10 |
| Charlie | Rich | 5 |
| | Young | 5 |
| Chris | Rich | 2 |

SYSTEM AND METHOD FOR ANALYTICALLY MODELING DATA ORGANIZED ACCORDING TO NON-REFERRED ATTRIBUTES

BACKGROUND OF THE INVENTION

1. Field of the Invention

The present invention relates to systems and methods for analytically modeling data organized and stored in a relational database, and, more particularly, to analytically modeling data organized according to non-referred attributes.

2. Description of the Prior Art

Online analytical processing (OLAP) is a key part of many data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, an OLAP cube may be modeled according to a user's perception of the data. The cube may have multiple dimensions, each dimension modeled according to attributes of the data. Typically, there is a hierarchy associated with each dimension. For example, a time dimension can consist of years subdivided into months subdivided into weeks subdivided into days, while a geography dimension can consist of countries subdivided into states subdivided into cities. Dimension members act as indices for identifying a particular cell or range of cells within the cube.

OLAP services are often used to analytically model data that is stored in a relational database such as, for example, an Online Transactional Processing (OLTP) database. Data stored in a relational database may be organized according to multiple tables with each table having data corresponding to a particular data type. A table corresponding to a particular data type may be organized according to columns corresponding to data attributes. For example, data corresponding to the type "Sales" may be organized in a "Sales" table with columns "Product" and "Quantity Sold". Data corresponding to the type "Stock" may be organized in a "Stock" table with columns "Product", "Aisle", and "Quantity Stocked". The "Sales" table does not reference the "Aisle" attribute. Thus, the sales of a particular product cannot be allocated across multiple aisles.

It is often desirable, however, to organize data from a table according to the attributes of another table. For example, it may be desirable to organize data from the "Sales" table according to the "Aisle" attribute of the "Stock" table to evaluate the number of sales for a particular aisle or for a particular set of aisles. Accordingly, a need exists for a system and method for analytically modeling data whereby data from a first table may be organized according to the attributes of a second table.

SUMMARY OF THE INVENTION

Accordingly a system and method for analytically modeling data organized according to non-referred attributes are disclosed. A first table and a second table are stored in a relational database. The first table organizes a first type according to a first attribute. The second table organizes a second type according to the first attribute and a second attribute.

The data stored in the relational database is analytically modeled in a data cube. A first measure is modeled according to the first type of the first table. A first dimension is modeled according to the first attribute of the first and second tables. A second dimension is modeled according to the second attribute of the second table.

The first measure is tied to the first dimension according to the first attribute of the first table to allow the first measure to be analyzed by the first dimension according to the first attribute. The first measure is tied to the second dimension by, for each entry of the first dimension, allocating the entry to each entry of the second dimension in a predetermined manner.

The first measure may be tied to the second dimension by allocating the entry to every one of select entries of the second dimension. The first measure may be tied to the second dimension by allocating a portion of the entry to each of select entries of the second dimension. The portion may be an even portion of the entry or it may be a portion. The first measure may also be tied to the second dimension by allocating the entry to a pre-determined principal entry of the second dimension.

A second measure may also be modeled according to the second type of the second table. The second measure may be tied to the first dimension according to the first attribute of the second table to allow the second measure to be analyzed by the first dimension according to the first attribute. The second measure may also be tied to the second dimension according to the second attribute of the second table to allow the second measure to be analyzed by the second dimension according to the second attribute.

BRIEF DESCRIPTION OF THE DRAWINGS

The illustrative embodiments will be better understood after reading the following detailed description with reference to the appended drawings, in which:

FIG. 2 is a sample relational database table corresponding to "Sales" data;

FIG. 3 is a sample relational database table corresponding to "Stock" data;

FIG. 5 is a sample relational database table corresponding to "Sales" data;

FIG. 6 is a sample relational database table corresponding to "Customer Demographic" data;

FIG. 9 is a sample hash table derived from the table of FIG. 6.; and

FIG. 10 is a sample record table derived from the tables of FIGS. 5 and 6.

DETAILED DESCRIPTION

Figure 1:
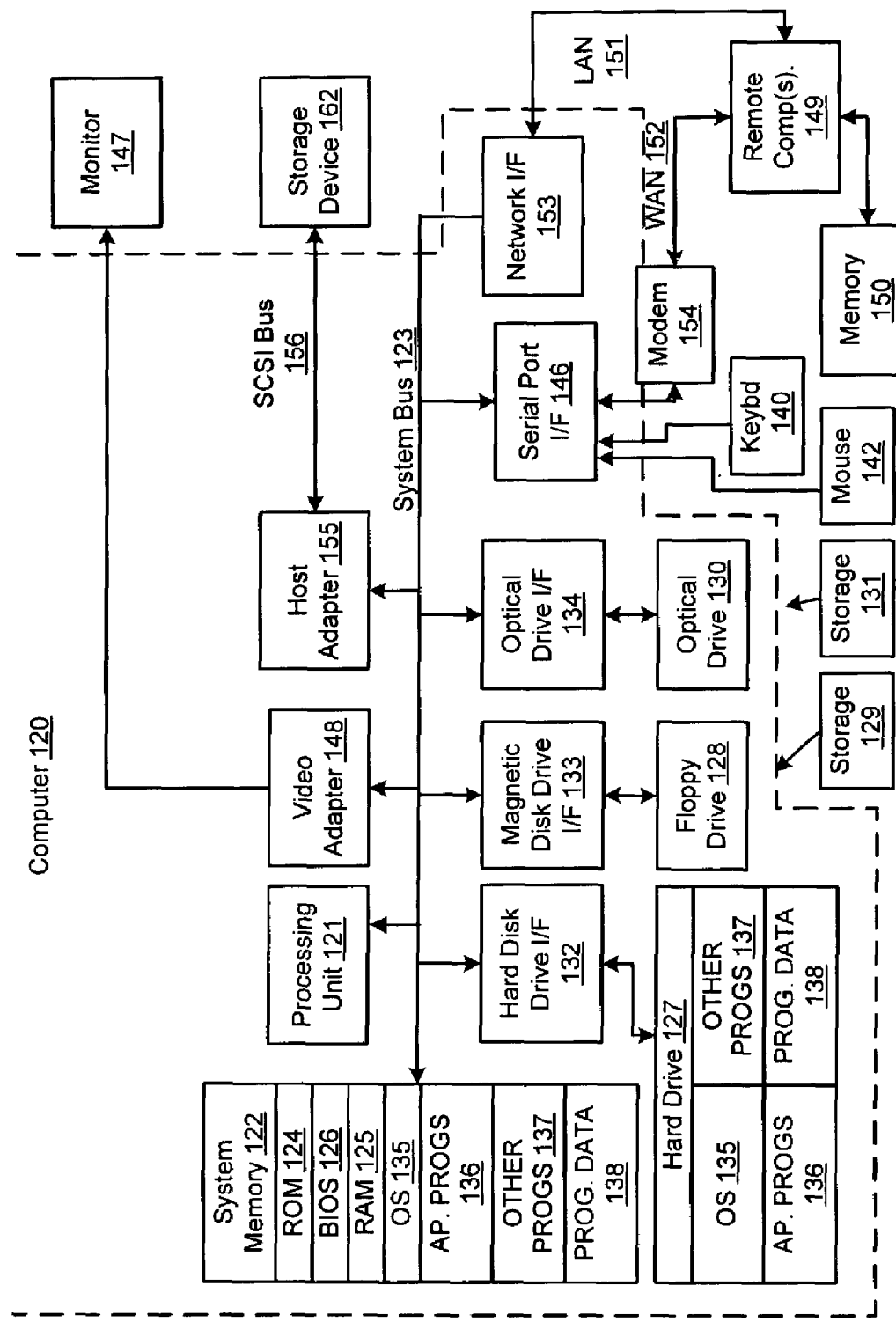
FIG. 1 is a block diagram representing a general purpose computer system in which aspects of the present invention and/or portions thereof may be incorporated.

A system and method for analytically modeling data organized according to non-referred attributes is disclosed below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

An analytical data service such as, for example, On-Line Analytical Processing (OLAP) may be employed to model data stored in a relational database such as, for example, an On-Line Transactional Database (OLTP). As set forth previously, data stored in a relational database may be organized according to multiple tables, with each table having data corresponding to a particular data type. A table corresponding to a particular data type may be organized according to columns corresponding to data attributes. One such table is shown in FIG. 2, with data corresponding to the type "Sales" organized in a "Sales" table 200 with columns "Product" 210 and "Quantity Sold" 212. Another such table is shown in FIG. 3, with data corresponding to the type "Stock" organized in a "Stock" table 300 with columns "Product" 310, "Aisle" 312, and "Quantity Stocked" 314. Sales table 200 does not reference "Aisle" attribute 312. As should be appreciated, tables 200 and 300 may have other columns (not shown) corresponding to other attributes.

Figure 4:
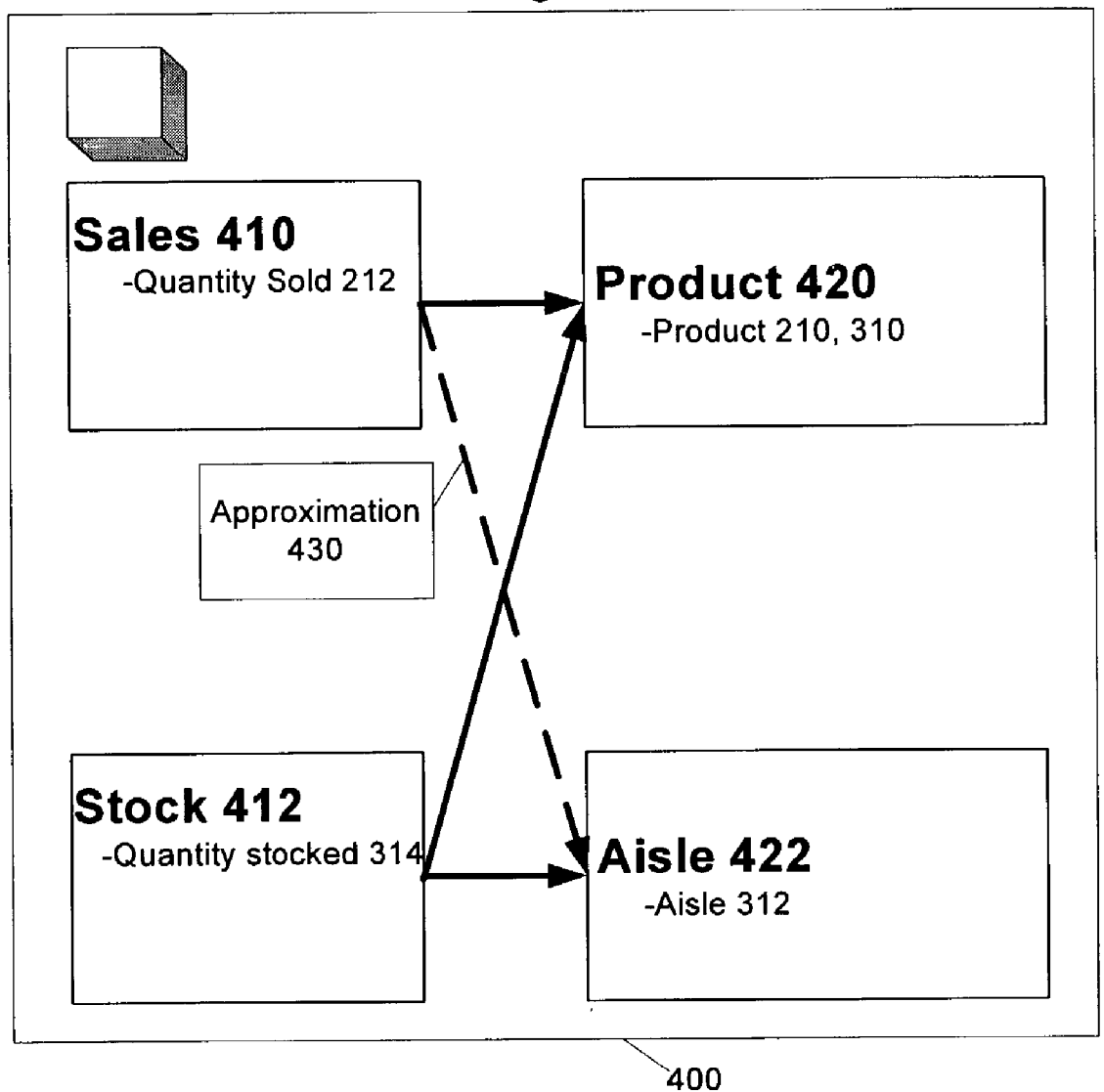
FIG. 4 is an analytical data cube derived from the tables of FIGS. 2 and 3 in accordance with one embodiment of the present invention.

Referring now to FIG. 4, analytical data cube 400 is an analytical model of the data from "Sales" table 200 and "Stock" table 300. Cube 400 has a first measure "Sales" 410 modeled according to "Sales" table 200 and a second measure "Stock" 412 modeled according to "Stock" table 300. Cube 400 also has a first dimension 420 modeled according to "Product" attribute 210 and 310 of "Sales" table 200 and "Stock" table 300, respectively. Cube 400 also has a second dimension 422 modeled according to "Aisle" attribute 312 of FIG. 3. As should be appreciated, cube 400 may have other dimensions (not shown) modeled according to other attributes.

"Sales" measure 410 is tied to "Product" dimension 420 according to the data in "Sales" table 200. "Stock" measure 412 is tied to "Aisle" dimension 422 according to the data in "Stock" table 300. "Stock" measure 412 is also tied to "Product" dimension 420 according to the data in "Stock" table 300. As should be appreciated, there is no data in "Sales" table 200 to tie "Sales" measure 410 to "Aisle" dimension 422 inasmuch as "Aisle" is a non-referenced attribute with respect to the "Sales" table 200. Thus, it is not known how to allocate sales of a particular product across multiple aisles, and, therefore, sales must be allocated according to an approximation 430.

Sales of a particular product across multiple aisles may, for example, be approximated by allocating a sale to every aisle in which the product is stocked. Particularly, for the 30 sales of bread, aisles 1, 2, and 3 may each be allocated 30 sales. For the 10 sales of chips, aisles 1 and 2 may each be allocated 10 sales. For the 2 sales of cookies, aisle 1 may be allocated 2 sales. As should be appreciated, although a sale is allocated to every aisle on which the product is stocked, the sales are not "double" counted across every aisle. For example, in response to the query, "What were the total sales of bread across all aisles?" the answer is 30 rather than 90.

Sales of a particular product across multiple aisles may also be approximated by allocating an even portion of a sale to each aisle in which the product is stocked. Particularly, for the 30 sales of bread, aisles 1, 2, and 3 may each be allocated 10 sales. For the 10 sales of chips, aisles 1 and 2 may each be allocated 5 sales. For the 2 sales of cookies, aisle 1 may be allocated 2 sales.

Sales of a particular product across multiple aisles may additionally be approximated by allocating to each aisle a portion of a sale that is equal to the portion of units of the product that are stocked on the aisle. Particularly, for the 30 sales of bread, aisle 1 may be allocated 6 sales, aisle 2 may be allocated 9 sales, and aisle 3 may be allocated 15 sales based on proportionate quantities of such item as stocked in each aisle according to "Stock" table 300 of FIG. 3. For the 10 sales of chips, aisle 1 may be allocated 4 sales, and aisle 2 may be allocated 6 sales. For the 2 sales of cookies, aisle 1 may be allocated 2 sales.

Sales of a particular product across multiple aisles may further be approximated by allocating a sale only to the principal aisle in which the product is stocked. Particularly, for the 30 sales of bread, aisle 3 may be allocated 30 sales based on such aisle 3 having the highest quantity of bread stocked. For the 10 sales of chips, aisle 2 may be allocated 10 sales based on similar reasoning. For the 2 sales of cookies, aisle 1 may be allocated 2 sales.

In addition to modeling a table with multiple measures as set forth above, a table may also be modeled only according to only a single "main" measure. Specifically, as shown in FIG. 5, a "Sales" table 500 may include columns "Customer" 510 and "Quantity Sold" 512. "Sales" table 500 may be referred to as the table. Additionally, as shown in FIG. 6, a "Customer Demographic" table 600 may include columns "Customer" 610 and "Demographic" 612.

Figure 7:
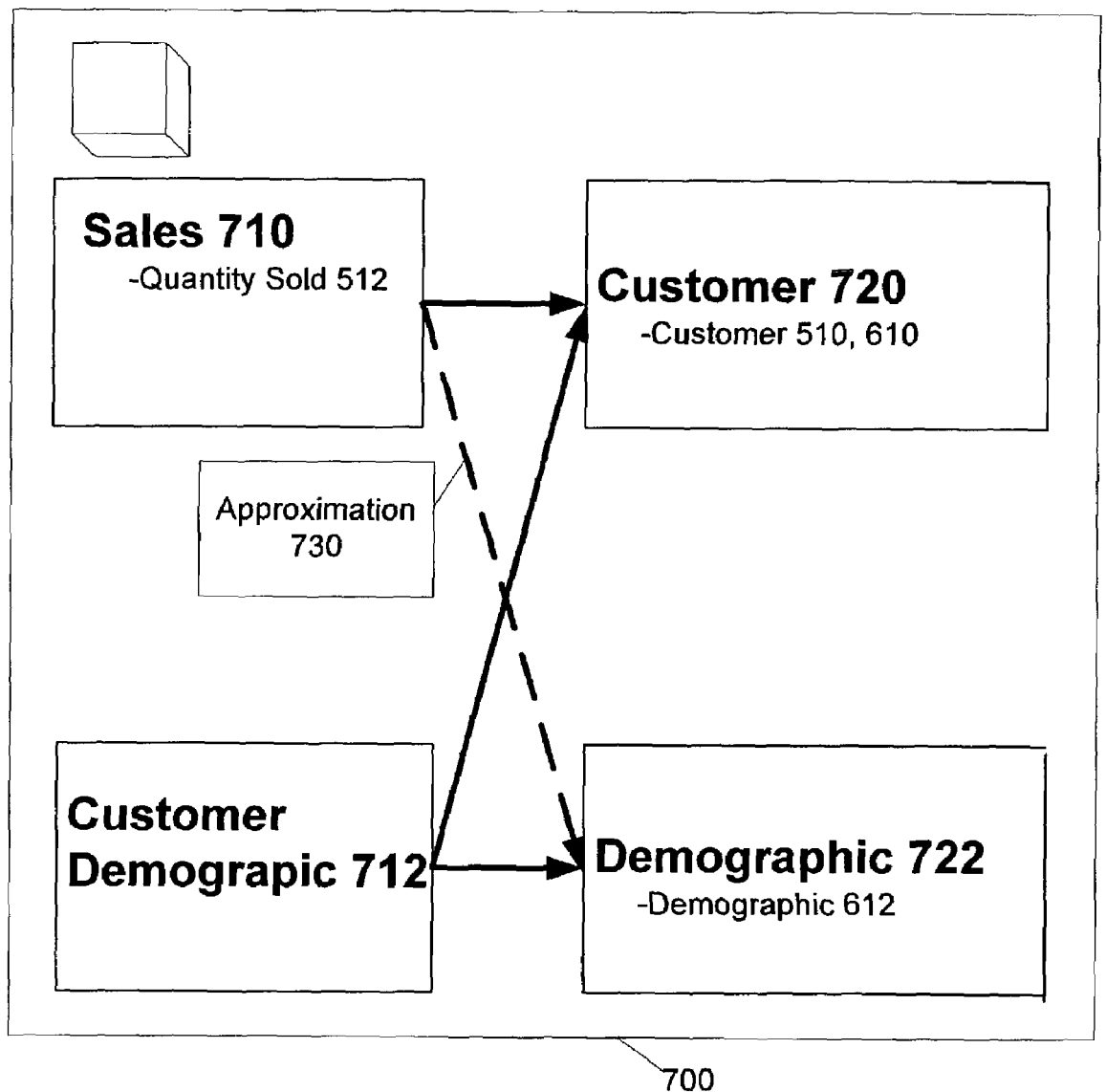
FIG. 7 is an analytical data cube derived from the table of FIGS. 5 and 6 in accordance with one embodiment of the present invention.

As shown in FIG. 7, data from "Sales" table 500 and "Customer Demographic" table 600 may be stored in analytical data cube 700. Cube 700 has a single "main" measure "Sales" 710 modeled according to "Sales" table 500. Cube 700 has a first dimension 720 modeled according to "Customer" attributes 510 and 610 of "Sales" table 500 and "Customer Demographic" table 600, respectively. "Customer" dimension 720 may be referred to as a "common" dimension because it is common to both "Sales" table 500 and "Customer Demographic" table 600.

Cube 700 also has a second dimension 722 modeled according to "Demographic" attribute 612 of "Customer Demographic" table 600. "Demographic" dimension 722 may be referred to as the "many to many dimension." "Customer Demographic" measure 712 may be referred to as the lookup measure because, although "Customer Demographic" is not an actual measure in cube 700, "Customer Demographic" table 600 includes many to many "Demographic" dimension 722 as a column 612.

As should be appreciated, cube 700 may have other dimensions (not shown) modeled according to other attributes.

"Sales" measure 710 is tied to "Customer" dimension 720 according to the data in "Sales" table 500. As should be appreciated, there is no data in "Sales" table 500 to tie "Sales" measure 710 to "Demographic" dimension 622 inasmuch as "Demographic" is a non-referenced attribute with respect to the "Sales" table 500. Thus, it is not known how to allocate sales to a particular customer across multiple demographics, and, therefore, sales must be allocated according to an approximation 730.

Sales to a particular customer across multiple demographics may, for example, be approximated by allocating a sale to every demographic. Particularly, for the 30 sales to Burt, demographics rich, young, and single may each be allocated 30 sales. For the 10 sales to Charlie, demographics rich and young may each be allocated 10 sales. For the 2 sales to Chris, demographic rich may be allocated 2 sales. As should be appreciated, although a sale is allocated to every demographic, the sales are not "double" counted across every demographic. For example, in response to the query, "What were the total sales to Burt across all demographics?" the answer is 30 rather than 90.

Sales to a particular customer across multiple demographics may also be approximated by allocating an even portion of a sale to each demographic. Particularly, for the 30 sales to Burt, demographics rich, young, and single may each be allocated 10 sales. For the 10 sales to Charlie, demographics rich and young may each be allocated 5 sales. For the to Chris, demographic rich may be allocated 2 sales.

Figure 8:
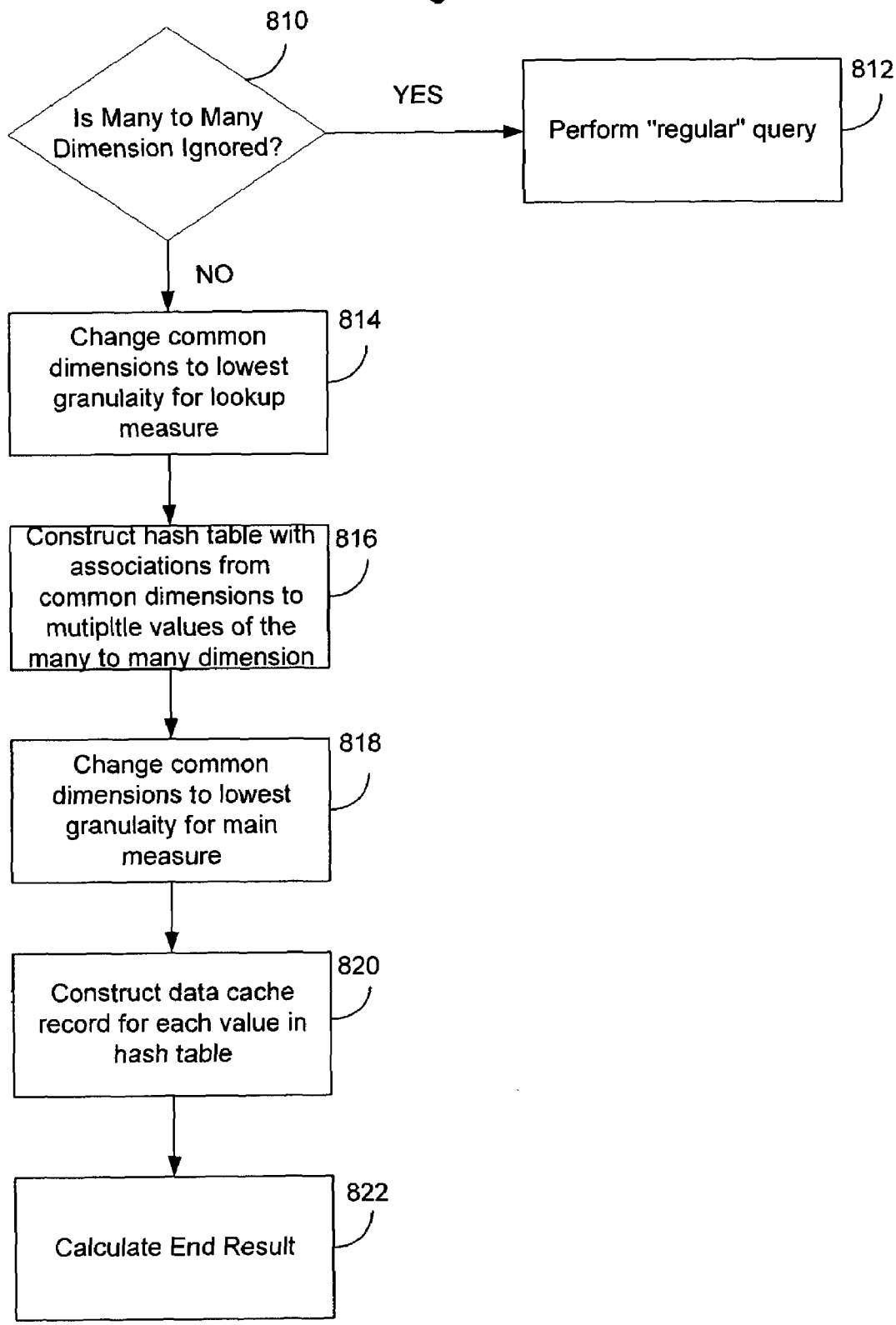
FIG. 8 is a flowchart of a method for implementing the cube of FIG. 7 in response to a query in accordance with one embodiment of the present invention.

An exemplary algorithm for implementing the organization of the cube of FIG. 7 in response to a query is shown in FIG. 8. As shown, at step 810, it is determined whether the granularity of many to many dimension 722 is ignored by the query. If many to many dimension 722 is ignored, then a "regular" query is performed at step 812. If the many to many dimension 722 is not ignored, then, at step 814, the granularity of the common dimension 720 is changed to the lowest granularity for lookup measure 712.

At step 816, a multiple entry hash table is constructed that includes the associations from common dimension 720 to multiple values of many to many dimension 722. Such an exemplary hash table is shown in FIG. 9. As shown, hash table 900 has common "Customer" column 720 and many to many "Demographic" column 722.

At step 818, the granularity of the common dimension 720 is changed to the lowest granularity for main measure 710. Many to many dimension 722 is changed to the ignored granularity.

At step 820, a data cache record including the many to many dimension value is constructed for each entry in hash table 900. Such an exemplary record is shown in FIG. 10. As shown, record 1000 has common "Customer" column 720, many to many "Demographic" column 722, and main "Quantity Sold" column 512. The values for main "Quantity Sold" column 512 are approximated by allocating an even portion of a sale across each demographic. As should be appreciated, any of the exemplary approximations set forth above with reference to FIGS. 4 and 7 may be used to approximate the values for main "Quantity Sold" column 512.

At step 822, the entries in record 1000 are used to calculate the end result. The end result is a cumulative sum of entries from record 1000. Although entries in record 1000 are recorded at the lowest granularity, records in the end result are not aggregated again. For example, in response to a query for sales by demographics, record 1000 is recorded at the lowest granularity as shown. However, in the end result, all entries corresponding to a particular demographic are summed rather than inserted separately. Specifically, the values for the entries [Burt, rich], [Charlie, rich], and [Chris, rich] are summed rather than inserted separately.

Thus, a system and method for analytically modeling data organized according to non-referred attributes have been disclosed. Data stored in a first and a second relational data table is analytically modeled in a data cube. The first table organizes a first type according to a first attribute. The second table organizes a second type according to the first attribute and a second attribute. A first measure is modeled according to the first type of the first table. A first dimension is modeled according to the first attribute of the first and second tables. A second dimension is modeled according to the second attribute of the second table. The first measure is tied to the first dimension according to the first attribute of the first table to allow the first measure to be analyzed by the first dimension according to the first attribute. The first measure is tied to the second dimension by, for each entry of the first dimension, allocating the entry to each entry of the second dimension in a predetermined manner.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

While the invention has been described and illustrated with reference to specific embodiments, those skilled in the art will recognize that modifications and variations may be made without departing from the principles of the invention as described above and set forth in the following claims. For example, while the invention has been described with reference to a "Sales" table, a "Stock" table, and a "Customer Demographic" table the invention may be used in conjunction with any table from a relational database. Furthermore, the analytical data models of the present invention may comprise any number of dimensions corresponding to any number of data attributes. Accordingly, reference should be made to the appended claims as indicating the scope of the invention.

We claim:

1. A method implemented at least in part by a computer, the method in combination with first and second tables of data, the first table organizing a first type according to a first attribute and a second attribute, and a second table organizing a second type according to the first attribute, the method comprising:

modeling a measure according to the second type of the second table;

modeling a first dimension according to the first attribute of the first and second tables;

modeling a second dimension according to the second attribute of the first table;

tying the measure to the first dimension according to the first attribute of the second table to allow the measure to access data for the first dimension according to the first attribute;

tying the measure to the second dimension by, for each entry of the first dimension, allocating a value of the measure for the entry of the first dimension by:

identifying each row in the first table within which a value of the first attribute matches a value of the entry of the first dimension, the first table including no data for the measure;

identifying a value of the second attribute within each identified row in the first table;

identifying each entry in the second dimension for which a value of the entry of the second dimension matches an identified value of the second attribute; and allocating at least a portion of the value of the measure for the entry of the first dimension to at least one of each identified entry of the second dimension; and generating and displaying a data cube that comprises the measure and the first and second dimensions, the data cube being used for analytically modeling data from at least the first and second tables.

2. The method of claim 1, comprising modeling the measure according to the second type of the second table, the second table comprising data stored in a relational database.

3. The method of claim 1, comprising allocating a complete portion of the value of the measure for the entry of the first dimension to every identified entry of the second dimension.

4. The method of claim 1, comprising allocating less than a complete portion of the value of the measure for the entry of the first dimension to each identified entry of the second dimension.

5. The method of claim 4, comprising allocating an even portion of the value of the measure for the entry of the first dimension to each identified entry of the second dimension.

6. The method of claim 4, comprising allocating a proportional portion of the value of the measure for the entry of the first dimension to each identified entry of the second dimension.

7. The method of claim 1, comprising allocating a total value of the measure for the entry of the first dimension to a pre-determined principal identified entry of the second dimension.

8. A computer readable medium having stored thereon computer readable instructions in combination with first and second tables of data, the first table organizing a first type according to a first attribute and a second attribute, and a second table organizing a second type according to the first attribute, the computer readable instructions, when executed by a processor, cause the processor to perform the following steps:

modeling a measure according to the second type of the second table;

modeling a first dimension according to the first attribute of the first and second tables;

modeling a second dimension according to the second attribute of the first table;

tying the measure to the first dimension according to the first attribute of the second table to allow the measure to access data for the first dimension according to the first attribute; and tying the measure to the second dimension by, for each entry of the first dimension, allocating a value of the measure for the entry of the first dimension by:

identifying each row in the first table within which a value of the first attribute matches a value of the entry of the first dimension, the first table including no data for the measure;

identifying a value of the second attribute within each identified row in the first table;

identifying each entry in the second dimension for which a value of the entry of the second dimension matches an identified value of the second attribute;

allocating at least a portion of the value of the measure for the entry of the first dimension to at least one of each identified entry of the second dimension; and generating and displaying a data cube that comprises the measure and the first and second dimensions, the data cube being used for analytically modeling data from at least the first and second tables.

9. The computer readable medium of claim 8, wherein the instructions cause the processor to perform the step of modeling the measure according to the second type of the second table, the second table comprising data stored in a relational database.

10. The computer readable medium of claim 8, wherein the instructions cause the processor to perform the step of allocating a complete portion of the value of the measure for the entry of the first dimension to every identified entry of the second dimension.

11. The computer readable medium of claim 8, wherein the instructions cause the processor to perform the step of allocating less than a complete portion of the value of the measure for the entry of the first dimension to each identified entry of the second dimension.

12. The computer readable medium of claim 11, wherein the instructions cause the processor to perform the step of allocating an even portion of the value of the measure for the entry of the first dimension to each identified entry of the second dimension.

13. The computer readable medium of claim 11, wherein the instructions cause the processor to perform the step of allocating a proportional portion of the value of the measure for the entry of the first dimension to each identified entry of the second dimension.

14. The computer readable medium of claim 8, wherein the instructions cause the processor to perform the step of allocating a total value of the measure for the entry of the first dimension to a pre-determined principal identified entry of the second dimension.

15. A system in combination with first and second tables of data, the first table organizing a first type according to a first attribute and a second attribute, and a second table organizing a second type according to the first attribute, the system comprising:

a processor operative to execute computer executable instructions; and memory having stored therein computer executable instructions for performing the following steps:

modeling a measure according to the second type of the second table;

modeling a first dimension according to the first attribute of the first and second tables;

modeling a second dimension according to the second attribute of the first table;

tying the measure to the first dimension according to the first attribute of the second table to allow the measure to access data for the first dimension according to the first attribute; and tying the measure to the second dimension by, for each entry of the first dimension, allocating a value of the measure for the entry of the first dimension by:

identifying each row in the first table within which a value of the first attribute matches a value of the entry of the first dimension, the first table including no data for the measure;

identifying a value of the second attribute within each identified row in the first table;

identifying each entry in the second dimension for which a value of the entry of the second dimension matches an identified value of the second attribute;

allocating at least a portion of the value of the measure for the entry of the first dimension to at least one of each identified entry of the second dimension; and generating and displaying a data cube that comprises the measure and the first and second dimensions, the data cube being used for analytically modeling data from at least the first and second tables.

16. The system of claim 15, comprising computer executable instructions for performing the step of modeling the measure according to the second type of the second table, the second table comprising data stored in a relational database.

17. The system of claim 15, comprising computer executable instructions for performing the step of allocating a complete portion of the value of the measure for the entry of the first dimension to every identified entry of the second dimension.

18. The system of claim 15, comprising computer executable instructions for performing the step of allocating less than a complete portion of the value of the measure for the entry of the first dimension to each identified entry of the second dimension.

19. The system of claim 18, comprising computer executable instructions for performing the step of allocating an even portion of the value of the measure for the entry of the first dimension to each identified entry of the second dimension.

20. The system of claim 18, comprising computer executable instructions for performing the step of allocating a proportional portion of the value of the measure for the entry of the first dimension to each identified entry of the second dimension.

21. The system of claim 15, comprising computer executable instructions for performing the step of allocating a total value of the measure for the entry of the first dimension to a pre-determined principal identified entry of the second dimension.

* * * * *